United States Patent [19]

Bulman

[11] Patent Number: 5,452,866
[45] Date of Patent: Sep. 26, 1995

[54] TRANSPIRATION COOLING FOR A VEHICLE WITH LOW RADIUS LEADING EDGE

[75] Inventor: Melvin J. Bulman, Folsom, Calif.

[73] Assignee: Aerojet General Corporation, Rancho Cordova, Calif.

[21] Appl. No.: 197,894

[22] Filed: Feb. 17, 1994

Related U.S. Application Data

[62] Division of Ser. No. 956,928, Oct. 5, 1992, Pat. No. 5,351,917.

[51] Int. Cl.$^6$ ............................... B64C 1/00; B64C 30/00
[52] U.S. Cl. ................................. 244/117 A; 244/158 A; 244/163; 60/265
[58] Field of Search .................... 244/117 A, 158 A, 244/160, 163; 60/265, 266

[56] References Cited

U.S. PATENT DOCUMENTS

| | | | |
|---|---|---|---|
| 3,026,806 | 3/1962 | Runton et al. | 244/117 A |
| 3,113,750 | 12/1963 | Beardsley | 244/117 A |
| 3,267,857 | 8/1966 | Lindberg, Jr. | 244/117 A |
| 3,731,893 | 5/1973 | Stalmach, Jr. | 244/117 A |
| 3,785,591 | 1/1974 | Stalmach, Jr. | 244/117 A |
| 3,797,781 | 3/1974 | Hollis | 244/117 A |
| 3,808,833 | 5/1974 | Allen et al. | 244/117 A |
| 3,908,936 | 9/1975 | Durran | 244/117 A |
| 4,014,485 | 3/1977 | Kinnaird et al. | 244/117 A |
| 4,275,857 | 6/1981 | Bergsten | 244/53 B |
| 4,739,952 | 4/1988 | Giles | 244/117 A |
| 4,966,229 | 10/1990 | Senterfitt | 165/41 |
| 4,991,797 | 2/1991 | Miller et al. | 244/117 A |
| 5,299,762 | 4/1994 | Kosson et al. | 244/130 |

OTHER PUBLICATIONS

Wietiny, "Shock Interference heating in Scramjet engines", Oct. 1990, pp. 1–7.
Henline, W., "Transpiration Cooling of Hypersonic Blunt Bodies with Finite Rate Surface Reactions," *NASA Contractor Report 177516*, Feb. 1989.
Nowak, et al., "Shock/Shock Interference on a Transpiration Cooled Hemispherical Model," *AIAA Fluid Dynamics, Plasma Dynamics and Lasers Conf.*, Seattle, Wash., Jun., 1990.
Wieting, A., "Shock Interference Heating in Scramjet Engines," *AIAA 2nd Int'l Aerospace Planes Conf.*, Orlando, Fla., Oct. 1990.

Primary Examiner—Andres Kashnikow
Assistant Examiner—Virna Lissi Mojica
Attorney, Agent, or Firm—Townsend and Townsend Khourie and Crew

[57] ABSTRACT

A transpiration cooling system for avoiding overheating of an airfoil is provided. The airfoil is provided with a plurality of apertures and a source of pressurized fluid for providing a flow of fluid through the apertures to establish an aerodynamic radius. The aerodynamic radius of curvature of leading edge is sufficiently greater than the mechanical radius of curvature of the leading edge that peak heat flux is independent of the mechanical radius of curvature. The mechanical radius of curvature is preferably less than 50% of the aerodynamic radius of curvature during hypersonic operation. Preferably the mechanical radius of curvature is the smallest allowed by the fabrication method (i.e., a knife edge), such as being less than about 0.02 inches, preferably less than about 0.01 inches. The transpiration blowing rate can be adjusted so that the blowing rate and aerodynamic radius of curvature are relatively low except during periods of maximum heat flux, such as the shock-on-lip point. Since the mechanical radius of curvature is effectively zero, control of the aerodynamic radius of curvature provides complete control of peak heat flux. By adjusting blowing rate to the minimum necessary at any given velocity, transpiration consumption, drag and fuel injection are reduced or eliminated.

11 Claims, 4 Drawing Sheets

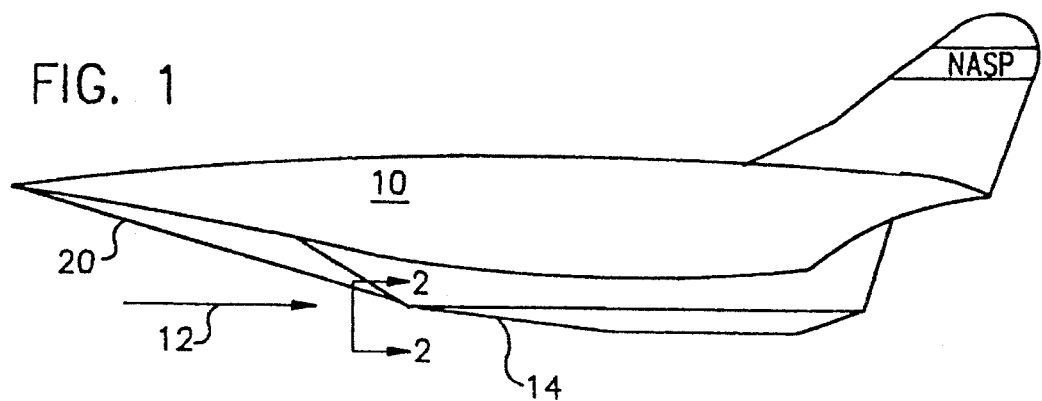
FIG. 1
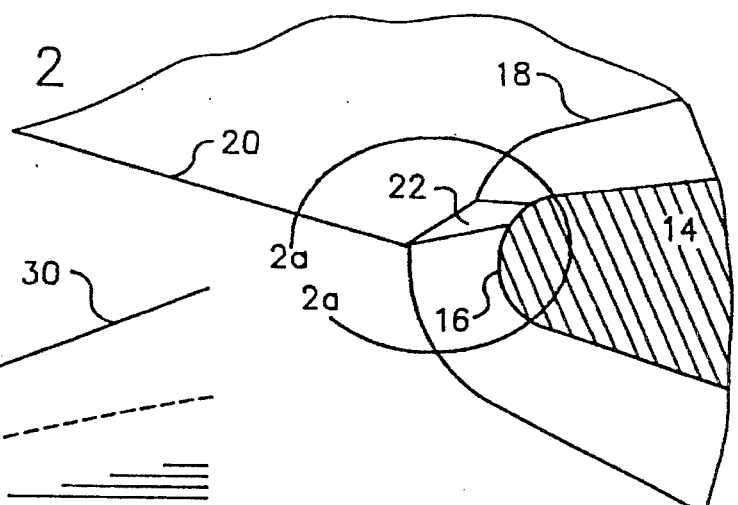
FIG. 2
FIG. 4
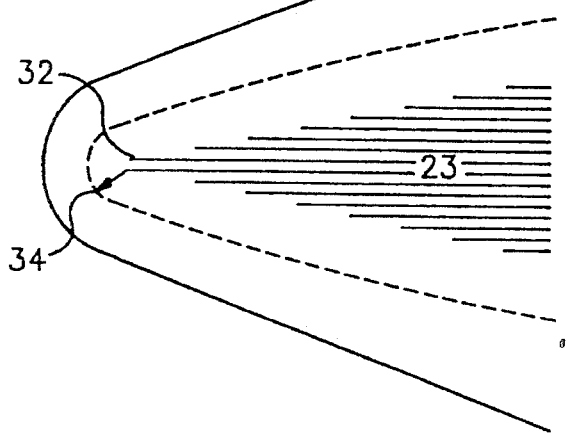
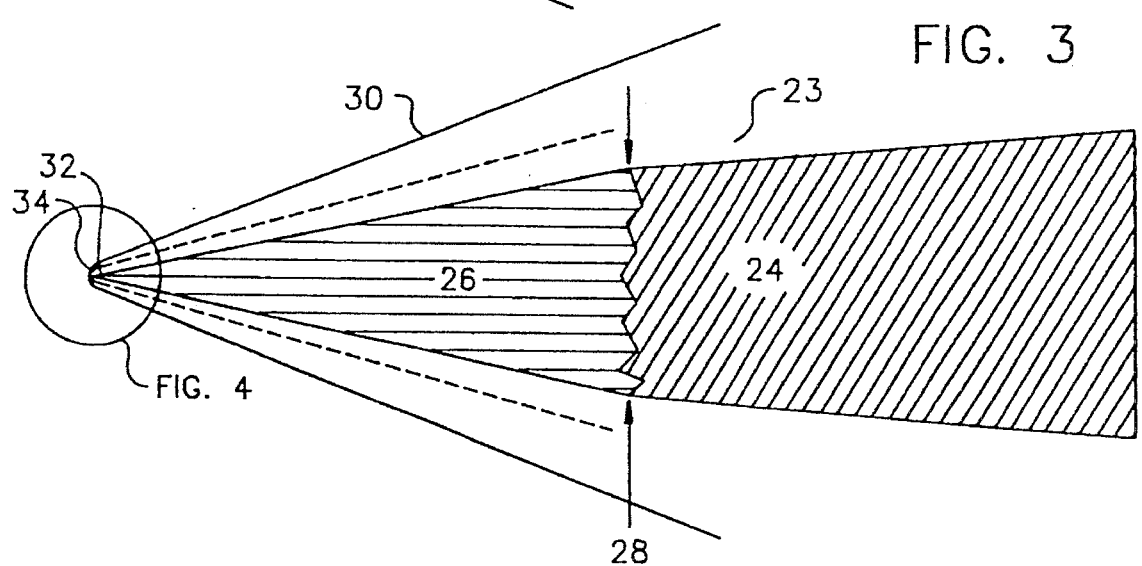
FIG. 3

TRANSPIRATION COOLING FOR A VEHICLE WITH LOW RADIUS LEADING EDGE

This is a divisional application of U.S. Ser. No. 07/956,928, filed Oct. 5, 1992 now U.S. Pat. No. 5,351,917.

BACKGROUND OF THE INVENTION

The present invention relates to a method and apparatus for transpiration cooling of a portion of the vehicle and in particular to cooling of a leading edge having a low radius of curvature.

High velocity vehicles such as air-breathing hypersonic vehicles typically must be provided both with a system for minimizing drag and for cooling portions of the vehicle, to accommodate heating rates. Accommodating both these requirements is particularly difficult for vehicles intended for sustained high velocity flight and/or orbital insertion, as opposed to reentry vehicles. Requirements during sustained flight and/or orbital insertion include operation over extended periods of time in an extremely hostile thermal environment. Stagnation temperatures for vehicles approaching orbital velocities can exceed 10,000° K. Attempts to achieve high net thrust (i.e., thrust minus drag), lead to designs in which a vehicle may be required to operate in a high dynamic pressure (high thrust) environment with sharp leading edges (to provide low drag). As discussed below, this combination of high temperature, high pressure and small leading edge radius is, generally, considered antagonistic to attempts to cool the vehicles since sharp leading edges are thought to produce extremely high local heat fluxes. In contrast, the thermal problem facing reentry vehicles is different because in reentry vehicles, high drag is desirable or at least acceptable. This allows a large leading edge radius to be used, accommodating installation of cooling systems. Furthermore, because of the typically short exposure of reentry vehicles to high temperature environments, the use of transient cooling systems, such as a heat sink or ablative techniques is feasible.

As noted above, in some respects the requirements of providing low drag and providing cooling are antagonistic. As the leading edge radius of curvature is reduced, the total heat load on the vehicle is reduced, as well as the drag. Unfortunately, the peak heat flux (as opposed to the total heat load) increases as the radius of that portion decreases. In general, the peak heat flux on the leading edge ($Q_{LE}$) is inversely proportional to the square root of the radius of curvature of the leading edge ($R_{LE}$), i.e., $Q_{LE} \propto (R_{LE})^{-1/2}$.

One type of cooling system used for portions of vehicles is a regenerative system, in which a heat transfer fluid (typically the fuel) contacts the interior surface of a vehicle skin, absorbing heat therefrom, and flows to the engine. However, as the leading edge radius of curvature is reduced, it becomes more difficult to install a regenerative circuit because of the small radius and slender section available for flow of the heat transfer fluid. Additionally, because the regenerative system depends on heat transfer through the skin, the regenerative or "back side convective" cooling system is limited by the thermal resistance of the structural material of the vehicle.

Another cooling system which has been used is transpiration cooling. In a transpiration cooling system, there is no return flow of the transpirant to the source. In transpiration cooling, fluid is conveyed to the interior surface of the vehicle skin and permitted to flow through perforations or pores through the vehicle skin. At a low rate of flow (or "blowing"), the transpirant fluid dilutes the hot boundary layer, reducing the driving enthalpy and (normally) the heat flux. This reduction in heat flux is referred to as "partial blockage". At higher blowing rates, the hot boundary layer is pushed completely away from the surface. Under these conditions, the surfaces are exposed only to the coolant temperature and the heat flux (ignoring radiation) is reduced to zero (providing full blockage). However, operating a transpiration cooling system at a blowing rate sufficient to continuously provide full blockage produces certain undesirable effects. Because the transpirant flow rate is high, there is a large consumption of transpirant and the weight of the large volume of transpirant which must be carried increases the size of the fuel tank needed for the vehicle. Further, the transpiration system produces an amount of drag which increases as the blowing rate increases. Furthermore, when the leading edge being cooled is in the vicinity of the vehicle engine (e.g., the leading edge of the engine cowl) a high blowing rate leads to high fuel ingestion into the engine inlet.

The above described cooling problems are compounded in the case of portions of the vehicle which may be subjected to shock interactions. An example is a hypersonic engine cowl. When the vehicle passes through its inlet design mach number, the vehicle fore body shock(s) interact with the cowl shock. This interaction from the two shocks (referred to as "shock-on-lip") produces a supersonic jet that sweeps across the cowl leading edge. Heat flux increases of 20 times have been reported to result from impingement of this jet on the surface of the cowl. Accordingly, there is a need for a cooling system which can accommodate heat flux increases from a supersonic jet without providing an unacceptable amount of coolant consumption, drag, or fuel ingestion, over the duration of a flight or mission.

SUMMARY OF THE INVENTION

The present invention includes the recognition that the above-described antagonism between increasing the cooling and decreasing the drag arises because the peak heat flux is strongly influenced by radius of curvature of the leading edge. The present invention involves an apparatus and method wherein the peak heat flux is made independent of the leading edge radius of curvature. For these purposes, a distinction is made between the leading edge radius of curvature (referred to as the "mechanical radius of curvature" $R_m$), i.e., the radius of curvature at the leading edge of the solid aircraft structure or skin and the "aerodynamic radius of curvature $R_a$", i.e., the equivalent aerodynamic shock generating shape. It has been found that by making the mechanical radius of curvature sufficiently small (compared to the aerodynamic radius) the peak heat flux becomes independent of the mechanical radius of curvature and instead becomes a function almost entirely of the aerodynamic radius of curvature. In this situation, from the point of view of the freestream flow considering peak heat flux, there is no mechanical leading edge, (the mechanical radius of curvature is effectively zero) i.e., the leading edge is equivalent to a leading edge having a mechanical radius of curvature of zero. The peak heat flux is substantially independent of the mechanical radius of curvature when:

$R_a > R_m$

The mechanical radius is effectively zero when it is less than 50% of the aerodynamic radius.

Once the mechanical radius of curvature is sufficiently small that it is uncoupled from peak heat flux, it can be designed to achieve the desired reduction in drag without the penalty of a proportional increase in the blowing rate (and thus without the disadvantages of increased coolant consumption, high drag and fuel ingestion). In one embodiment, the mechanical radius of curvature is less than about 0.01 inches (about 0.25 mm). To reduce drag, the mechanical radius of curvature of the leading edge is preferably the smallest allowed by the fabrication method (i.e., a knife edge).

Furthermore, because the aerodynamic radius is a function of the blowing rate, the aerodynamic radius can be adjusted during a flight. In particular, it is possible to maintain a relatively low blowing rate except during the portion of flight in which a supersonic jet impinges on the leading edge. The blowing rate can be increased to provide an aerodynamic radius that is sufficient to hold the supersonic jet off the mechanical or structural surface of the vehicle. At higher or lower speeds, when the supersonic jet does not impinge, the blowing rate can be reduced, thus causing an overall reduction in the amount of coolant consumption, drag, and fuel ingestion, on a per-flight basis.

BRIEF DESCRIPTION OF THE DRAWINGS

FIG. 1 is a view of a hypersonic vehicle;

FIG. 2 is a schematic view of shock interaction taken along line 2—2 of FIG. 1;

FIG. 3 is a schematic, cross-sectional view of the leading edge below the shock-on-lip velocity;

FIG. 4 is an enlarged view of region 4—4 of FIG. 3;

DETAILED DESCRIPTION OF THE PREFERRED EMBODIMENT

Figure 5:
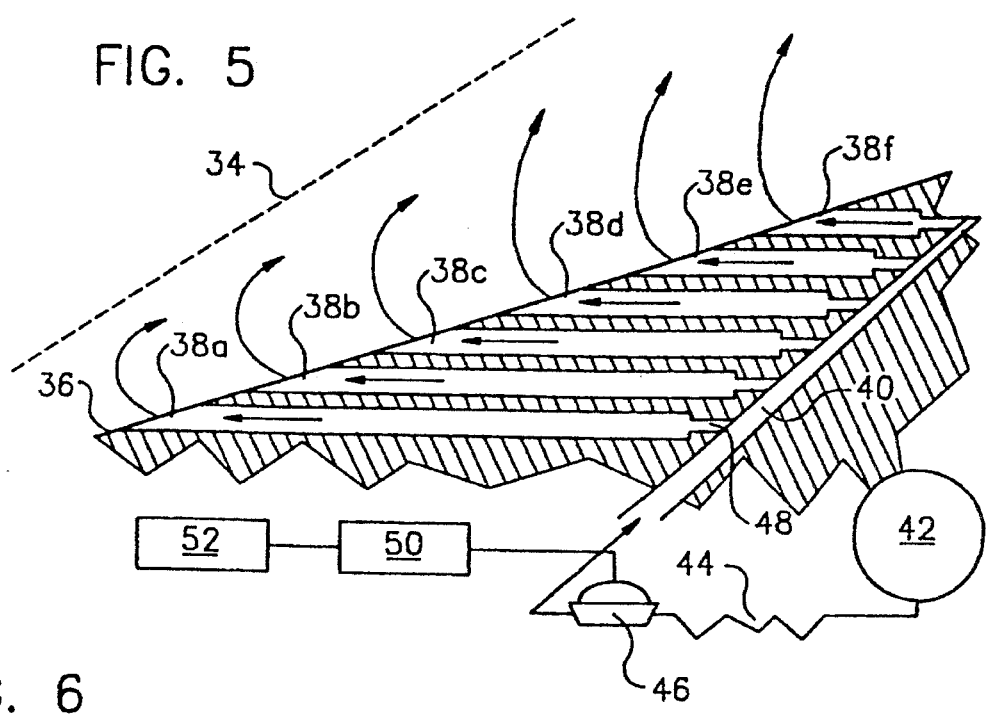
FIG. 5 is a schematic depiction of a transporation cooling system, according to an embodiment of the present inventions.

As seen in FIG. 1, a vehicle such as a hypersonic aircraft 10 has a number of leading edges with respect to the ambient atmosphere as defined by the freestream direction 12. Among the leading edges are the forward edges of the engine cowling 14. Depending upon the configuration and speed of the vehicle 10, certain of the leading edges may be subjected to shock interactions. As seen in FIG. 2, the engine cowl 14 has a leading edge surface 16. The sharpness of the leading edge can be defined by a radius of curvature of the leading edge 16. Since, on a given scale of analysis, the contour of the leading edge may not be precisely circular, references throughout to a radius of curvature are for the purposes of relative measure of leading edge bluntness.

As shown in FIG. 2, in a region near the leading edge 16, several aerodynamic shock waves can form and interact. In the situation depicted in FIG. 2, a cowl bow shock 18 interacts with an incident forebody shock 20 to produce a region of supersonic jet flow 22 which impacts the engine cowl 14 in the region of the leading edge 16. Supersonic jets of this type are discussed in Allan R. Wieting, "Shock Interference Heating in Scramjet Engines," *AIAA Second International Aerospace Planes Conference*, Oct. 29–31, 1990, incorporated by reference.

FIG. 3 depicts, schematically, in cross section, the cowl leading edge in which the aft portion 24 is regeneratively cooled and the forward portion 26 is transpiration cooled as described more fully below. The thickness 28 at the junction of the aft 24 and forward 26 sections, in the embodiment depicted in FIG. 3, is about one inch (about 2.5 centimeters). FIG. 3 depicts the situation in which the speed of the cowl 23 in the ambient fluid is less than the speed at which a supersonic jet impinges the leading edge (the "shock-on-lip" speed). At hypersonic speeds below the shock-on-lip point, a shock 30 is formed by interaction of the leading edge 32 with the ambient fluid. More precisely, the shock 30 is formed by the interaction of the aerodynamic radius 34 generated by the transpirant. The region of the leading edge 32 is depicted in greater detail in FIG. 4. As shown in FIG. 4, the aerodynamic radius 34 is spaced away from the mechanical surface of the cowl 23 by transpiration cooling. A schematic view of the transpiration cooling system is depicted in FIG. 5. As shown in FIG. 5, the transpirant flows to the surface of the cowl 36 through a large number of pores 38a–f. These pores can be formed e.g., by a photochemical machining process. In this process thin sheets of metal are etched with the coolant passages. These sheets or platelets can be diffusion bonded to form a solid structure with many small controlled passages. These flow circuits can include distribution manifolds 40 and individual metering orifices 48. These orifices 48 control the flow to each individual pore to match the local coolant flow to the local heat flux which can vary greatly across the surface. The heat flux and coolant flow requirements are generally greatest at the leading edge. At high blowing rates the coolant travels further from the surface before being swept away. The interface 34 demarks the boundary between the coolant and free stream air. The metering of the coolant flow through the individual pores has a strong influence on the shape of the boundary.

The transpirant is usually drawn from the main fuel 42 where it is used to cool the engine or other aircraft hot surface 44. A regulating valve 46 controls the amount of coolant delivered to the distribution manifold 40. A number of fluids can be used as the transpirant, including nitrogen gas, $N_2O_4$, and water. Preferably, hydrogen is used. The rate of flow of transpirant through the holes 38a–38f is provided by controlling the opening of the valve 46, such as by a control mechanism 50 in response to, for example, a speed indication from anemometer 52.

Returning to FIG. 4, at speeds below the shock-on-lip point, coolant flow can be minimal since there is no supersonic jet impaction and thus the blowing rate need only be high enough to provide transpiration cooling sufficient to deal with the shock 30.

Figure 6:
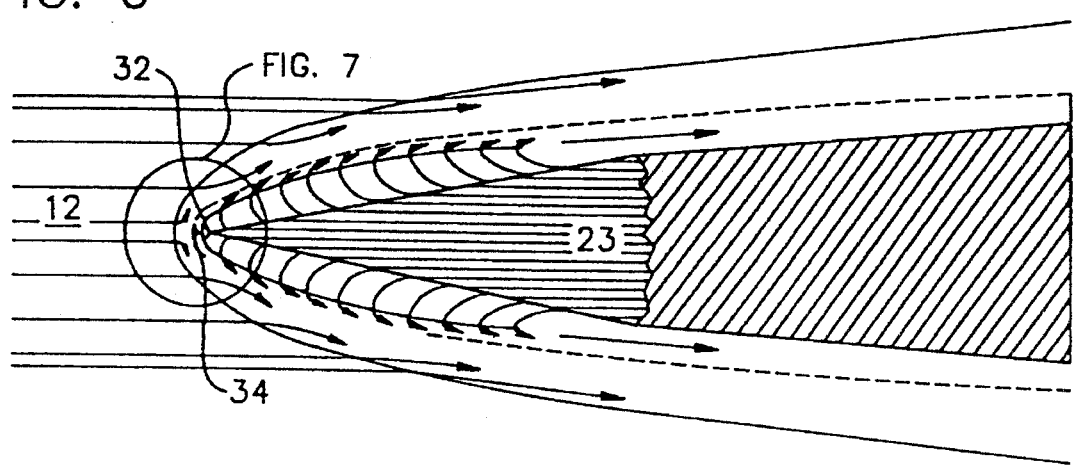
FIG. 6 is a schematic cross-sectional view of a leading edge at a speed just below the shock on limit condition.
Figure 7:
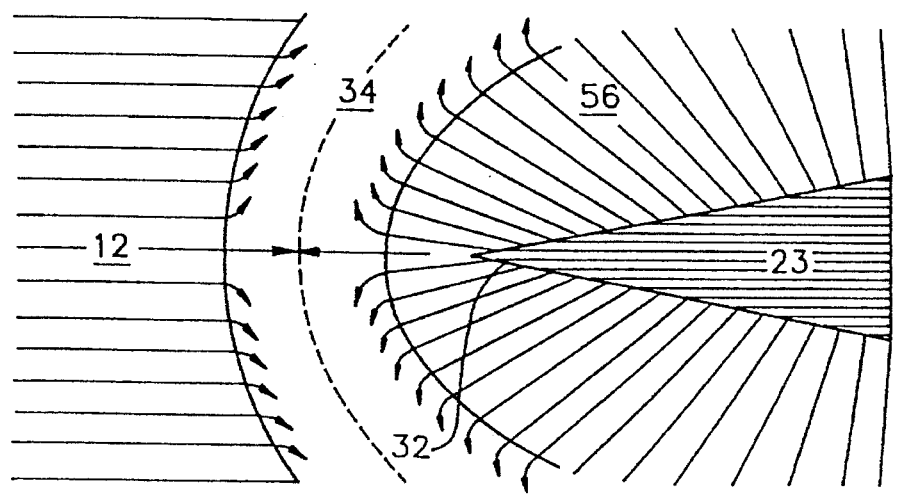
FIG. 7 is an enlarged view of region 7—7 of FIG. 6.

FIG. 6 shows the cowl 23 at a speed just below the shock-on-lip condition. The heat flux in this condition is somewhat greater than the heat flux in the condition depicted in FIG. 4, and accordingly, coolant flow is increased (e.g., by opening valve 46 somewhat), pushing the aerodynamic radius 34 farther away from the structural surface in preparation for the shock-on-lip condition. Thus, the aerodynamic radius of FIGS. 3 and 4 is less than the aerodynamic radius of FIGS. 6 and 7. The mechanical radius of curvature of the leading edge is, of course, unchanged. The mechanical radius of curvature of the leading edge 32 is substantially less than the aerodynamic radius of curvature 34. According to one embodiment of the present invention, the mechanical radius of curvature of the leading edge 32 is sufficiently small that the freestream 12 is aerodynamically substantially unaffected by the mechanical leading edge 32, instead interacting aerodynamically (at least with regards to heat flux) as if only the aerodynamic radius 34 were present. In one embodiment, the radius of curvature of the leading edge 32 is sufficiently small that even though the aerodynamic radius 34 may be one to two orders of magnitude larger than the mechanical radius of curvature, the aerodynamic radius of curvature 34 is still relatively small such as being less than about 0.2 inches (about 5 millimeters), preferably less than about 0.1 inches (about 2.5 millimeters).

In one embodiment the aerodynamic radius of curvature is at least 1.5 times said mechanical radius of curvature, preferably two times said mechanical radius of curvature, more preferably at least five times said mechanical radius of curvature, and most preferably at least about ten times said mechanical radius of curvature. Although in the situations depicted in FIGS. 6 and 7 the flow of transpirant 56 is greater than that of the situation depicted in FIGS. 3 and 4, it is still relatively low compared to that needed to cool a larger leading edge radius, contributing to minimizing the amount of transpirant 42 which must be stored on board.

Figure 8:
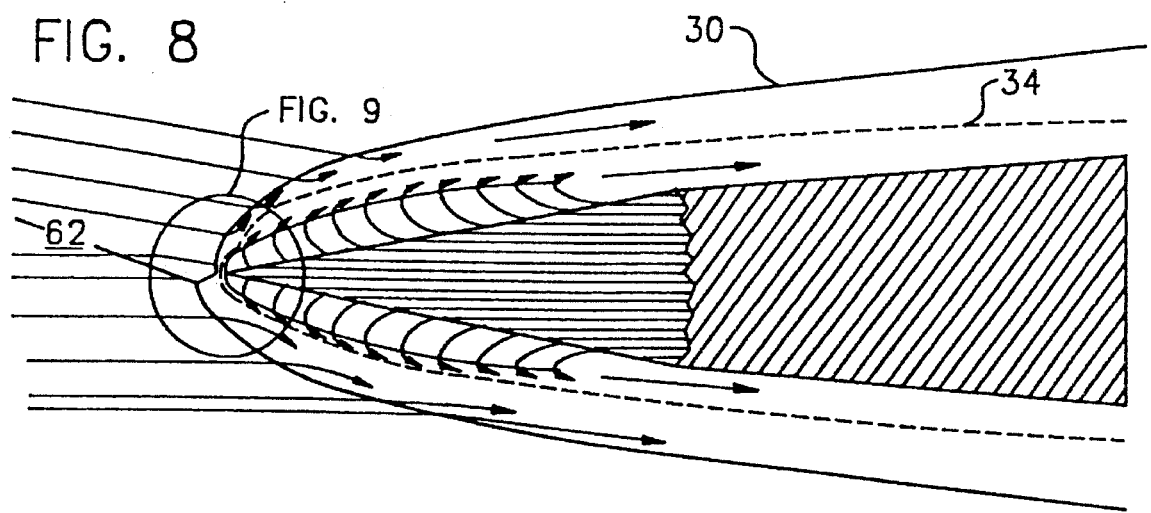
FIG. 8 is a schematic cross-sectional view of a leading edge at a velocity about equal to the shock-on-lip point.
Figure 9:
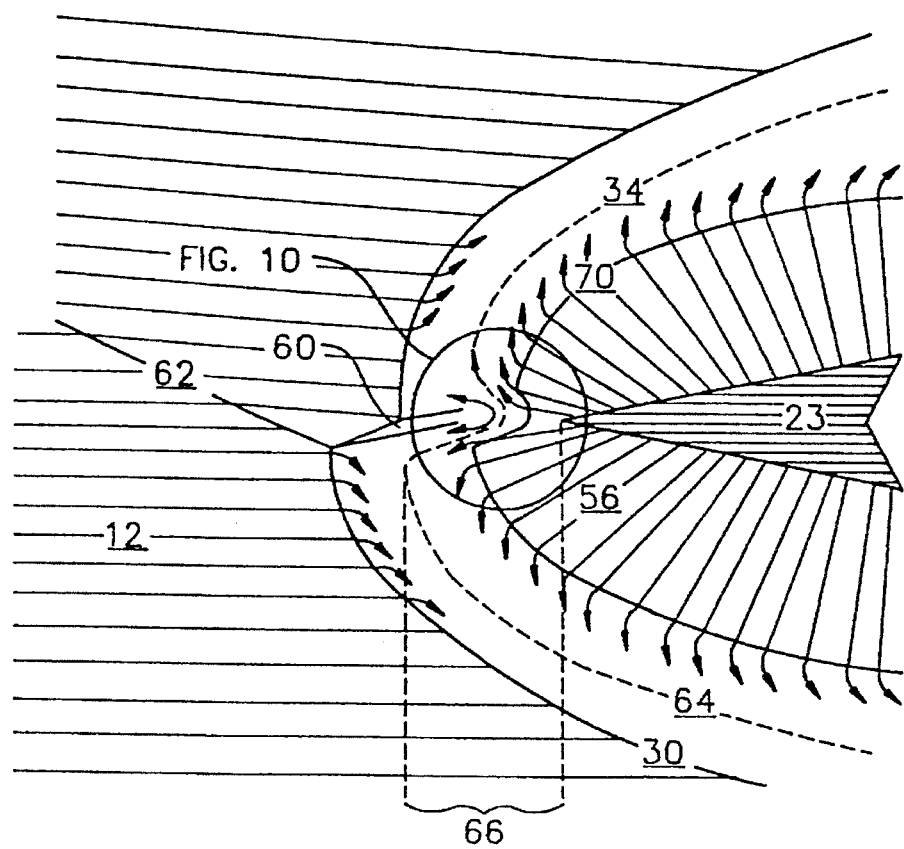
FIG. 9 is an enlarged view of region 9—9 of FIG. 8.
Figure 10:
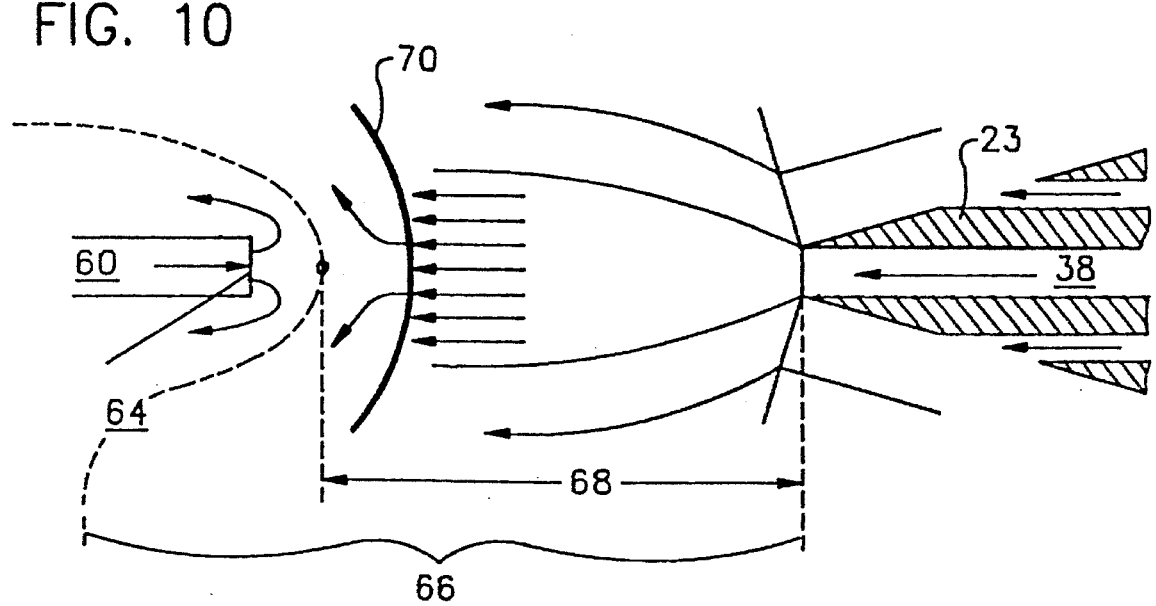
FIG. 10 is an enlarged view of region 10—10 of FIG. 9 showing the jet stand-off mechanism according to the present invention.

FIG. 8 depicts the situation in which the cowl has a velocity equal to the shock-on-lip point. In this situation, as depicted in FIG. 9, a supersonic jet 60 is formed as a result of the cowl shock 30 interacting with the incident of forebody shock 62. The flow through the two oblique shocks is compressed more efficiently and the result of the high energy is manifested in the high velocity of the flow confined to the jet 60. An interface region 64 forms as a result of the counter-flows of transpirant 56 and the freestream 12. The jet 60 arrives at the coolant interface 64 with the same strength as if it were approaching solid surface of the same radius as the interface 64. However, because the interface 64 is spaced from the mechanical surface of the cowl 23, the jet would have to penetrate further through the coolant layer 66 to reach the mechanical surface. As the jet penetrates into the coolant layer 66, it continues to lose strength. The shock and viscous losses of the jet increase as the jet descends deeper into the higher-pressure counter-flowing coolant 56. As the jet gets closer to the surface (the origin of the coolant flow), the dynamic pressure of the coolant is greater (the flow field surrounding the tip of the cowl is nearly a radially expanding source with increasing velocity and decreasing pressure as it moves away from the source). As depicted in FIG. 10, if the coolant flow is sufficient, equilibrium is established with the jet 60 stagnated a "stand off" distance 68 away from the surface of the cowl 23. This stand off distance 68 should be great enough that the individual coolant jets emerging from each pore 38 have merged to form a solid front. If the stagnation is allowed to occur too close to the surface, some of the hot gas from the jet 60 may find its way into "weak" wake zones (between the flow from individual coolant jets) and reach the surface. A safe stand off distance 68 will be determined by the spacing between the coolant pores or slots and the pressure ratio.

Other dissipation mechanisms may further help in breaking up the supersonic jet 60. Turbulence in the coolant jets may produce an unsteady bow shock 30. This unsteadiness may cause the jet 60 to move around rapidly, causing stronger interactions between the jet 60 and the surrounding flow field.

Further acceleration will cause the cowl to have a velocity greater than the shock-on-lip velocity. After passing through the shock-on-lip velocity, the coolant flow can be throttled back to the value needed to reduce the heat flux without shock interaction (similar to the situation depicted in FIGS. 6 and 7). Thus, mission coolant consumption may be significantly reduced when compared to previous approaches.

Because previous designs have resulted in heat flux which is, at least partly, a function of mechanical radius of curvature, it was not previously possible to vary the radius of curvature to both reduce drag and provide effective cooling since the mechanical radius of curvature of the leading edge could not be readily varied. According to the present invention, the mechanical radius of curvature is made extremely small so that (aerodynamically and considering heat flux) it is non-existent (i.e., the imposed heat flux is an inverse function of blowing rate). In this way, it is possible to provide effective transpiration cooling when it is most needed (at the shock-on-lip velocity) without maintaining a blowing rate so high as to have unacceptable transpirant consumption with the attendant increased drag and fuel ingestion.

Figure 11:
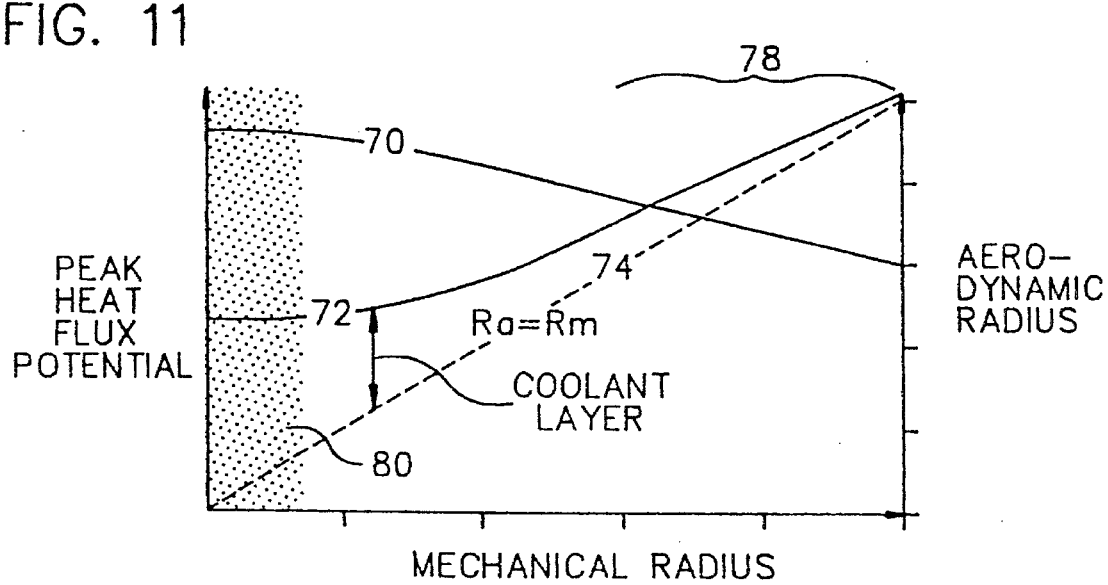
FIG. 11 is a schematic view of the relationship between mechanical radius, peak heat flux potential and aerodynamic radius according to an embodiment of the present invention.

FIG. 11 illustrates the manner in which the present invention provides for a peak heat flux which is substantially independent of mechanical radius. FIG. 11 is a schematic depiction of both mechanical radius versus aerodynamic radius and mechanical radius versus the heat flux potential. FIG. 11 is schematic in nature and the axes are in arbitrary units. Previous workers in the field recognize that high heat flux problems were made more serious in the case of the leading edge with a small radius of curvature, as discussed above, principally because, as the radius of curvature decreases, a given amount of heat is concentrated in a smaller and smaller region. For this reason, previous workers approaching the problem tended to work in design having a relatively high mechanical radius. It has been found, unexpectedly that, according to the present invention, many of the heat flux difficulties can be solved by operating in a very low mechanical radius region 80. According to one embodiment of the invention the mechanical radius is less than 0.05 inches (about 1.25 mm), preferably less than about 0.01 inches (about 0.25 millimeters). Operation in this region is practical because, for very low mechanical radius of curvature, the heat flux is no longer a function of mechanical radius but solely a function of aerodynamic radius. This is an advantage because, unlike the mechanical radius of curvature, the aerodynamic radius of curvature can be varied. The independence of heat flux from mechanical radius in this region can be seen from FIG. 11. In FIG. 11, a first curve 70 shows heat flux potential as a function of mechanical radius when transpiration-cooled. Curve 72 shows aerodynamic radius as a function of mechanical radius for a transpiration-cooled surface with a sufficient blowing rate to cool the surface. The dotted curve 74 shows values for which the aerodynamic radius is equal to the mechanical radius (no blowing). As seen in FIG. 11, in regions of larger mechanical radius 78, the heat flux 70 is substantially an inverse function of mechanical radius. However, in the low mechanical radius region 80, the heat flux curve 70 is substantially constant and independent of the mechanical radius curve 74. Thus, in the low mechanical radius region 80, changes in mechanical radius have substantially no effect on the peak heat flux potential 70.

In view of the above discussion, a number of advantages of the present invention may be seen. The present invention permits transpiration cooling of a hypersonic vehicle without excessive transpirant consumption, drag or fuel ingestion. Thus, large cooling rates are restricted to a limited period (during which the cowl passes through the shock-on-lip point) so that overall transpirant consumption for a given mission or flight can be relatively small. The present invention permits a small mechanical radius which will result in reduced drag while providing sufficient transpiration cooling to deal with the shock-on-lip problem. A number of variations and modifications of the invention can also be used. The present invention can be used in connection with surfaces other than an engine cowl leading edge, fuel injection struts, such as wing and fuselage surfaces. Certain aspects of the invention can be used without employing other aspects. For example, it is possible to provide for low mechanical radius of curvature devices with transpiration cooling where coolant flow is not necessarily reduced at velocities above the shock-on-lip velocity. The present invention can be used in connection with applications where a supersonic shock other than a shock-on-lip jet is formed. The present invention can be used in connection with vehicles when no supersonic jet is formed.

Although the present invention has been described by way of a preferred embodiment and certain variations and modifications, other variations and modifications can also be used the invention being defined by the following claims.

What is claimed:

1. In a hypersonic aircraft having an engine and an engine cowl, the engine cowl having a skin, a leading edge of said engine cowl having a mechanical radius of curvature, a transpiration cooling system for avoiding overheating of said cowl, comprising:

a plurality of pores in said skin permitting flow of fluid through said portion of said skin;

means for providing pressurized fluid to an interior surface of said skin for flow through said skin, forming an aerodynamic radius of curvature;

said aerodynamic radius of curvature being greater than said mechanical radius of curvature and said mechanical radius being about 0.01 inches or less.

2. A cooling system, as claimed in claim 1, wherein said aerodynamic radius of curvature is about 0.1 inches.

3. A transpiration cooling system for an airfoil, at least a leading edge part of said airfoil defining a first mechanical radius of curvature, the cooling system comprising:

first means for allowing fluid flow through at least a portion of the surface of said airfoil;

second means for supplying a flow of fluid to said first means;

third means for controlling the rate of flow of fluid through said portion of the surface to define an aerodynamic radius of curvature, said aerodynamic radius of curvature being at least 1.5 times larger than said mechanical radius of curvature so that peak heat flux is determined entirely by said aerodynamic radius of curvature and is substantially unaffected by said mechanical radius of curvature.

4. A transpiration cooling system for an airfoil, at least a leading edge part of said airfoil defining a first mechanical radius of curvature, the cooling system comprising:

first means for allowing fluid flow through at least a portion of the surface of said airfoil;

second means for supplying a flow of fluid to said first means;

third means for controlling the rate of flow of fluid through said portion of the surface to define an aerodynamic radius of curvature, said aerodynamic radius of curvature being larger than said mechanical radius of curvature so that drag is determined substantially entirely by said aerodynamic radius of curvature and is substantially unaffected by said mechanical radius of curvature;

wherein said mechanical radius of curvature is about 0.01 inches or less.

5. A cooling system, as claimed in claim 4, wherein said means for controlling includes means for controlling the rate of flow to provide an increased rate of flow during impingement of a supersonic jet on said airfoil.

6. A cooling system, as claimed in claim 4, wherein, when said airfoil is moving at a velocity with respect to the ambient atmosphere, said means for controlling includes means for providing a first flow rate at a first airfoil velocity, a second flow rate at a second airfoil velocity greater than said first airfoil velocity and a third flow rate at a third airfoil velocity greater than said second airfoil velocity, said second flow rate being greater than said first flow rate and said third flow rate being less than said second flow rate.

7. In an airfoil having a velocity with respect to ambient atmosphere, said airfoil having a mechanical surface, said airfoil being impinged by a supersonic jet when it reaches a second airfoil velocity after accelerating through a first velocity, said first velocity lower than said second velocity, a method for cooling said airfoil comprising:

accelerating said vehicle to said second velocity, said airfoil surface being subjected, during said acceleration, to a supersonic jet at said second velocity of said vehicle, flowing a fluid from the interior of said airfoil to the exterior to create an aerodynamic surface; and controlling the rate of flow to provide a higher rate of flow at said second velocity than at said first velocity;

wherein the rate of flow at said second velocity prevents said jet from impinging on said mechanical surface.

8. A method, as claimed in claim 7, wherein the rate of flow at said second velocity is greater than the rate of flow at said first velocity, said second velocity being greater than said first velocity.

9. A method, as claimed in claim 7, wherein:

said step of flowing comprises flowing said fluid through a plurality of openings to define a merged surface at which the individual flows from a plurality of said openings merge.

10. A method, as claimed in claim 9, wherein the rate of flow at said second velocity prevents said jet from penetrating said merged surface.

11. In a hypersonic vehicle having an air breathing engine and an engine cowl, the engine cowl having a skin, the leading edge of said engine cowl having an airfoil surface, a method for providing for orbital acceleration of said vehicle while avoiding overheating of the engine cowl, the method comprising:

accelerating said vehicle from a first velocity to an earth-orbital velocity, said airfoil surface being subjected, during said acceleration, to a supersonic jet when said vehicle attains a second velocity, flowing a fluid from the interior of said airfoil to the exterior during at least a part of said acceleration to create an aerodynamic surface, wherein said fluid flows through a plurality of apertures formed in said skin; and controlling the rate of flow to provide a higher rate of flow at said earth-orbital velocity than at said first velocity.

* * * * *